United States Patent [19]

Moss

[11] Patent Number: 4,612,076

[45] Date of Patent: Sep. 16, 1986

[54] LABEL LAMINATING METHOD

[75] Inventor: James A. Moss, Huntington Beach, Calif.

[73] Assignee: Willett International Limited, Slough, England

[21] Appl. No.: 673,084

[22] Filed: Nov. 19, 1984

[51] Int. Cl.[4] .......... B32B 31/04

[52] U.S. Cl. .......... 156/249; 156/277; 156/285; 156/384; 156/497; 156/541; 156/542

[58] Field of Search .......... 156/230, 235, 239, 277, 156/285, 384, 497, 541, 542, 249

[56] References Cited

U.S. PATENT DOCUMENTS

| | | | |
|---|---|---|---|
| 3,301,733 | 1/1967 | West et al. | 156/363 |
| 3,483,059 | 12/1969 | Dinter | 156/497 |
| 3,729,362 | 4/1973 | French et al. | 156/542 |
| 3,745,083 | 7/1973 | Aungst et al. | 156/541 |
| 3,756,896 | 9/1973 | Kono | 156/495 |
| 3,756,897 | 9/1973 | Shields et al. | 156/517 |
| 3,907,626 | 9/1975 | Cook | 156/497 |
| 4,024,011 | 5/1977 | Crankshaw et al. | 156/542 |
| 4,046,613 | 9/1977 | Kucheck et al. | 156/497 |
| 4,153,496 | 5/1979 | Swift | 156/384 |
| 4,240,862 | 12/1980 | Ishiyama | 156/384 |
| 4,264,403 | 4/1981 | Emmel et al. | 156/511 |
| 4,287,016 | 9/1981 | Kerwin et al. | 156/497 |

*Primary Examiner*—Caleb Weston
*Attorney, Agent, or Firm*—Charles D. Gunter, Jr.

[57] ABSTRACT

A device and method are shown for laminating a label on a surface of a moving article after first applying the label to the surface of the moving article. A pressure sensitive label is applied from a label dispenser to the receiving face of a vacuum box where it is releasably retained by reduced pressure within the box. A piece of transparent, pressure sensitive laminate material is similarly dispensed to the vacuum grid and retained in position by reduced gas pressure. As an article to be labeled is moved past the vacuum box, a blast of positive gas pressure is supplied through the vacuum grid and against the label to transfer the label to the surface of the article. As the article continues to move, a blast of positive gas pressure is supplied through the vacuum grid in the vacinity of the laminate material to remove the laminate material and transfer the material to the surface of the moving article to laminate the previously applied label.

8 Claims, 4 Drawing Figures

LABEL LAMINATING METHOD

BACKGROUND OF THE INVENTION

1. Field of the Invention

The present invention relates generally to devices for applying and laminating labels and, specifically, to a device and method for applying a laminate material to a label after the label has been applied to the surface of an article.

2. Description of the Prior Art

The market for printing and applying variable information labels and bar code labels, referred to as "VIB" labels, is expanding. UPC and U.S. government coding requirements have increased the need for bar code printing systems and more efficient methods of applying these labels.

Many bar code readers utilize pen scanners to wipe across the label. A label laminate would protect the label indicia from abrasion, scuffing, smearing, as well as from unwanted tampering. Certain military requirements call for laminated labels to prevent open air deterioration of the label information.

U.S. Pat. No. 3,756,896, to Kono, issued Sept. 4, 1973, shows a typical prior art device for laminating a magnetic strip onto a tag or label stock. The lamination is first accomplished, and the magnetic tag stock is then wound onto a take up roll for use with appropriate printing and data processing equipment.

U.S. Pat. No. 4,153,496, to Swift, issued May 8, 1979, shows an apparatus for manufacturing a continuous strip of pressure sensitive labels having permanently mounted pressure sensitive transparent hinged covers thereon. The hinged covers are used to cover information subsequently added to the label prior to adding the label to an article.

U.S. Pat. No. 4,264,403, to Emmel et al., issued Apr. 28, 1981, shows a portable tape dispenser for preparing write-on labels from a continuous strip of label stock and transparent pressure sensitive adhesive tape. After preparing the laminated label, it is torn off and applied to the surface of an article.

The above prior art devices all illustrate the problem toward which the present invention is directed. While the prior devices have provided means for laminating labels, none of the devices allow the application of a laminating material to a label after the label has been applied to a moving article. In addition, none of the above devices allow label indicia to be printed upon the label stock which is first supplied to the moving article and which is then laminated in a subsequent step.

SUMMARY OF THE INVENTION

The present invention has as its object a method and device for applying a laminate material to a label on a moving article after the label has been applied to the surface of the article. The invention also has as its object the provision of a device and method for printing variable printing indicia upon the label stock which is thereafter applied to the article and subsequently laminated.

The above objects are accomplished by supplying a pressure sensitive label from a label dispenser to a receiving face of a label applying station, the label applying station having gas passage means which opens at the receiving face. A piece of transparent laminate material is also supplied to the receiving face of a laminate applying station, the laminate applying station having similar gas passage means which opens at the receiving face. The pressure sensitive label is releasably retained at the label applying station, and the laminate material is retained at the laminate applying station by applying reduced pressure through the gas passage means to the receiving faces of the respective stations. An article to be labeled is then moved past the label applying station. As the article is moving, a blast of gas is applied through the gas passage means of the label receiving face and against the label on the label receiving face of the label receiver. The gas blast removes the label from the label receiving face and transfers the label to the surface of the article. As the article continues to move past the laminate applying station, a blast of gas is applied through the passage means of the laminate receiving face. The gas is applied against the laminate material on the laminate receiving surface. This gas blast removes the laminate material from the laminate receiving face and transfers the laminate material to the surface of the moving article to laminate the previously applied label.

The method of the invention also comprises the step of first supplying a pressure sensitive label from a label dispenser to a printing station and, thereafter, printing label indicia upon the pressure sensitive label at the printing station. The label containing the variable printing information is then moved from the printing station to the receiving face of the label applying station and the laminating steps previously described are again carried out.

Additional objects, features, and advantages will be apparent in the written description which follows.

DETAILED DESCRIPTION OF THE INVENTION

Figure 1:
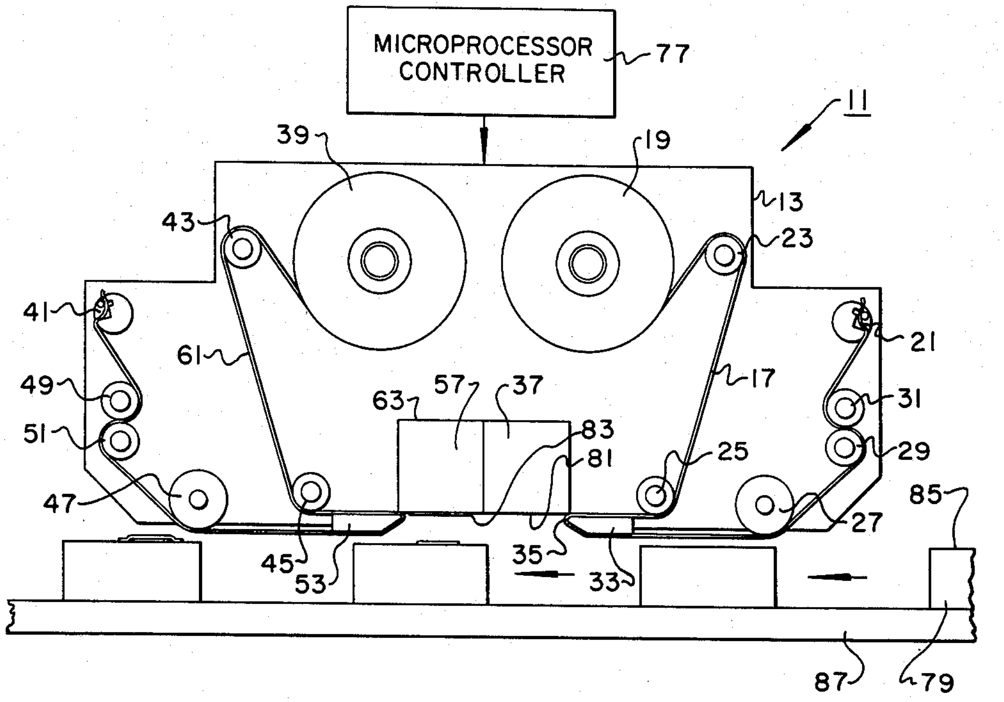
FIG. 1 is a side view of the label laminating device of the invention illustrating the operation of the device schematically.

FIG. 1 shows a label laminating device of the invention designated generally as 11. The label laminating device 11 includes a support structure 13 upon which is mounted a label dispensing means and a laminate dispensing means. Although the dispensing means of the invention can be of various kinds, in the embodiment illustrated, the label dispensing means and laminate dispensing means are identical but oppositely arranged structures mounted upon the support structure 13. The label dispensing means is adapted for use with pressure sensitive adhesive labels (15 in FIG. 2) carried by an elongated backing strip or web 17. The label dispensing means includes a supply reel 19 on which a supply of labels is wound, a take-up reel 21, a suitable number and arrangement of intermediate rollers 23, 25, 27, 29 and 31, and a peeler bar 33. One of the rollers 31 is intermittently driven by a motor (not shown) to intermittently move the backing strip 17 from the supply reel 19 over a peeling edge 35 of the peeler bar 33 to the take-up reel 21. This sequentially removes the labels 15 from the backing strip 17 and supplies them to the label receiver 37. This form of label dispensing means is conventional and, for this reason, is not shown or described in detail.

The laminate dispensing means is identical to, but oppositely arranged from, the label dispensing means previously described. The laminate dispensing means thus includes a supply reel 39 upon which is carried pieces of transparent laminate material (59 in FIG. 2) carried by an elongated backing strip or web 61. The transparent laminate material 59 has an adhesive lower surface in contact with the web 61 to allow for pressure sensitive application of the laminate material 59 in the same fashion that the labels 15 are applied. The laminate dispensing means includes a take-up reel 41, a suitable number and arrangment of intermediate rollers 43, 45, 47, 49 and 51, and a peeler bar 53. One of the rollers 51, is intermittently driven by a motor (not shown) to intermittently move the backing strip 61 from the supply reel 39 over a peeling edge 55 of the peeler bar 53 to the take-up reel 41. This action sequentially moves the laminate material 59 from the backing strip 61 and supplies the pieces of laminate material to the laminate receiver 57.

Figure 3:
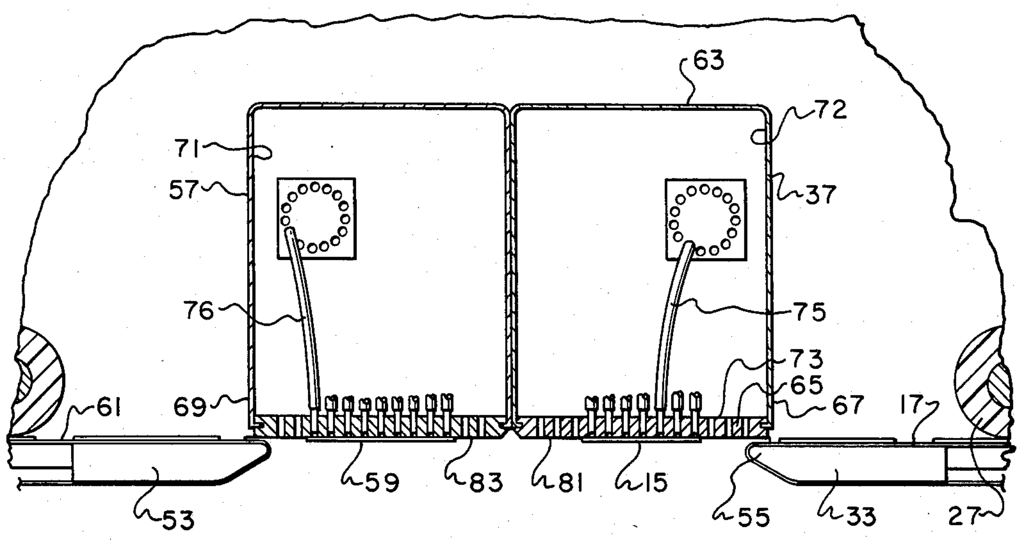
FIG. 3 is a side view of the vacuum box of the device of FIG. 1 with portions broken away to illustrate the gas passage means thereof.

The label receiver 37 and the laminate receiver 57 can each comprise portions of a common housing or vacuum box 63 having a pervious lower surface or grid 65. The label receiver 37 and laminate receiver 57 can also comprise independent but identical vacuum boxes with separate gas passage means. The opposing ends 67, 69 of the vacuum box 63 lie closely adjacent to the respective peeling bars 33, 53 of the label dispensing means and the laminate dispensing means. As shown in FIG. 3, the labels 15 and pieces of laminate material 59 are peeled from the backing webs 17, 61 at the peeler bars, 33, 53 and are retained upon the pervious grid 65 by the vacuum pressure within the chambers 71, 72 of the vacuum box 63.

The vacuum pressure within the chambers 71, 72 can be provided in various ways. Usually, the chambers 71, 72 are relatively air tight and are in communication with a vacuum pump (not shown). The vacuum pump is adapted to maintain the chambers at a pressure less than atmospheric. The grid 65 includes an inner wall 73 having apertures for receiving the ends of a plurality of flexible tubes 75. The flexible tubes 75 can be selectively positioned in various patterns within the grid 65 and are connected to a source of positive gas pressure for intermittently supplying a blast of air to a label 15, and a piece of laminate material 59.

The compressed air is transmitted from a source of compressed air through a valve and air manifold to the plurality of flexible tubes. The valve is automatically opened and closed in accordance with conventional practice to provide properly timed air blasts of the requisite duration. Similarly, the drive motors which turn the intermediate rollers 31, 51 are controlled by microprocessor electronics contained within a programmable microprocessing unit 77. By sensing the arrival of an article 79 to be laminated and by knowing the speed of movement of the article, the microprocessor can direct the dispensing of labels 15 to the receiving surface 81 of the label receiver 37 and the dispensing of laminate material 59 to the laminate receiving surface 83, as well as control the sequential application of the label and laminate material to the article 79.

Devices of the above type suitable for practicing the method of the invention are commercially available. A suitable device is sold as the Gemini Model 2320 Label Applicator, available from Willett Technology Corporation, 1661 Hickory Drive, Fort Worth, Tex. 76117.

Figure 2:
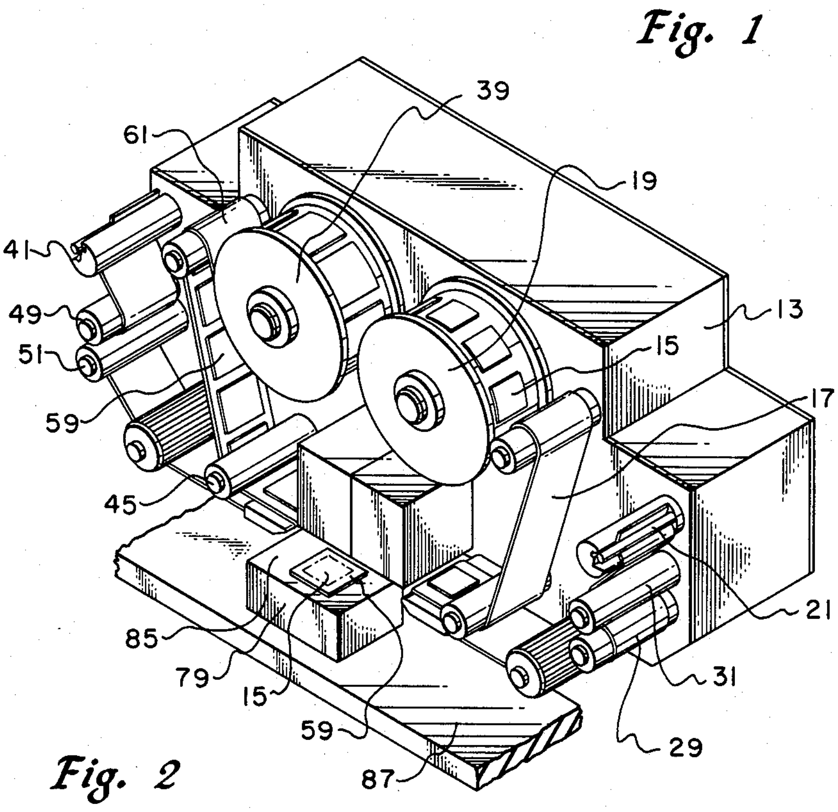
FIG. 2 is a perspective view of the laminating device of the invention, showing a laminated label.

The method of the invention will now be described with reference primarily to FIGS. 1 and 2. An article 79 having a surface 85 to be labeled and laminated is moving in the direction of the label laminating device 11 on a conveyor belt 87. As the article 79 approaches the label receiver 37, a pressure sensitive label 15 is supplied from the label dispensing means to the receiving face 81 of the label applying station. The label 15, as shown in FIG. 3, is releasably retained upon the grid 65 by the reduced pressure within the chamber 72 of the vacuum box 63.

Similarly, a piece of transparent laminate material 59 is supplied from the laminate dispensing means to the receiving face 83 of the laminate applying station and retained in position on the vacuum grid 65. As the article 79 approaches the label receiver 37 (FIG. 1), the leading edge of the article is detected, as by a photocell, and the microprocessor computes the time delay necessary for properly positioning the label upon the surface 85. After an appropriate time interval, a blast of air is supplied through the flexible tubes 75 in the vicinity of the label 15 and against the label on the label receiving face 81 to remove the label 15 from the label receiving face 81 and to transfer the label 15 to the surface of the article 79.

As the article continues to move in the direction of the laminate receiver 57, the microprocessor computes the necessary time delay, after which a gas blast is applied through the appropriate flexible tube 76 against the laminate material 59 to remove the laminate from the laminate receiving face 83 and to transfer the laminate material to the surface of the moving article to laminate the previously applied label 15. The label 15 is thus first applied to the moving article 79, and a protective covering of a laminate material 59 is subsequently applied to the label on the moving article 79.

The novel method of the invention has been described with reference to the use of commercially available labeling equipment. Devices are commercially available for unwinding roll label stock such as that shown on supply reel 19 and for feeding such label stock on demand to a VIB printer. After printing, the device then provides rewinding of the label stock onto cores for use as the supply label stock as has been described. Devices are also available which allow the use of wide web label stock with VIB printing systems. Using such devices, multiple labels can be simultaneously printed across the web, i.e., 2–6 labels in a row across the web, with the printed product being dispensed as individual rolls of printed label stock each of which is suitable for use as the supply reel 19. By whatever means, the previously printed label stock would be provided on the supply reel 19 and be dispensed to the label receiver 37, as has been discussed.

Figure 4:
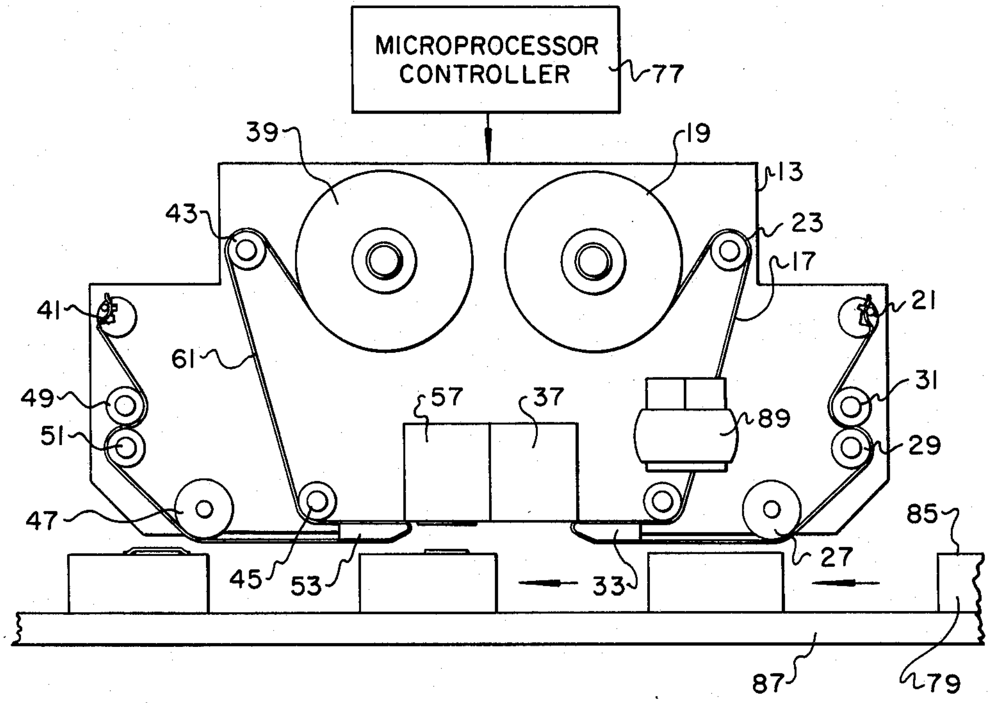
FIG. 4 is a side view of a label laminating device of the invention illustrating the operation of a printing station included in the method of the invention.

FIG. 4 shows a further improvement to the novel method of the invention. In FIG. 4, the label dispensing means and laminate dispensing means are as previously described. However, a printing station 89 is now present on the support structure 13 in the vacinity of the label peeler bar 33. In the method of the invention shown in FIG. 5, blank label stock from the supply reel 19 passes through the printing station 89 on its way to the peeler bar 33. The microprocessor control 77 directs previously programmed printing upon the blank label stock, and the label are transferred to the label receiver 37. A variety of commercially available printers can be utilized in the print station 89, including impact printers, ink jet printers, and thermal printing devices. For instance, the Allen Hot Foil Coder, part no. HFC-38/12 could be utilized. The printed label would then be applied to the article at the label receiver 37, after which the label would be laminated at the laminate receiver 57. This arrangement would provide greater flexibility in the type of printed indicia upon the labels and allow print information to be modified during the operation of the system.

An invention has been provided with several advantages. Existing labeling equipment can be utilized to provide a laminated label which resists scuffing, smearing or tampering with little or no modification to the existing equipment. The laminating process is achieved without complicated thermal heating elements, adhesive baths, and other cumbersome features of prior art devices. Since the laminate material is applied to the label after the label is applied to the product, label information can be changed very conveniently. Using the embodiment of the invention shown in FIG. 5, print indicia on the label stock can be changed by microprocessor control 77 while articles are moving on the conveyor belt 87. The laminating method of the invention is fast and accurate, allowing upwards of 1,000 laminated labels per minute to be applied.

While the invention has been shown in only two of its forms, it is not thus limited but is susceptible to various changes and modifications without departing from the spirit thereof.

I claim:

1. A method of laminating a label on a surface of an article, comprising the steps of:

supplying a pressure sensitive label from a label dispenser to a receiving face of a label applying station, the label applying station having gas passage means which open at the receiving face;

supplying a piece of transparent laminate material to a receiving face of a laminate applying station, the laminate applying station having gas passage means which open at the receiving face;

releasably retaining the pressure sensitive label at the label applying station and the laminate material at the laminate applying station by applying reduced pressure through the gas passage means to the receiving faces of the respective stations;

moving the article to be labeled past the label applying station;

applying a blast of gas through the passage means of the label receiving face and against the label on the label receiving face of the label receiver to remove the label from the label receiving face and to transfer the label to the surface of the article;

continuing to move the article past a laminate applying station; and applying a blast of gas through the passage means of the laminate receiving face and against the laminate material on the laminate receiving surface to remove the laminate material from the laminate receiving face and to transfer the laminate material to the surface of the moving article to laminate the previously applied label.

2. The method of claim 1, wherein the labels used in the label dispenser are supplied from pre-printed label stock carried on a backing web and wound onto a supply reel.

3. The method of claim 1 wherein the labels supplied to the receiving face of the label applying station are printed with label indicia at a printing station as the labels travel from the label dispenser to the applying station.

4. A method of laminating a label on a surface of a moving article after first applying the label to the surface of the moving article, comprising the steps of:

supplying a pressure sensitive label from label dispenser to a printing station;

printing label indicia upon the pressure sensitive label at the printing station;

moving the printed label from the printing station to a receiving face of a label applying station, the label applying station having gas passage means which open at the receiving face;

supplying a piece of transparent, pressure sensitive laminate material to a receiving face of a laminate applying station, the laminate applying station having gas passage means which open at the receiving face;

releasably retaining the pressure sensitive label at the label applying station and the laminate material at the laminate applying station by applying reduced pressure through the gas passage means to the receiving faces of the respective stations;

moving the article to be labeled past the label applying station;

applying a blast of gas through the passage means of the label receiving face and against the label on the label receiving face of the label receiver to remove the label from the the label receiving face and to transfer the label to the surface of the article;

continuing to move the article past a laminate applying station; and applying a blast of gas through the passage means of the laminate receiving face and against the laminate material on the laminate receiving face to remove the laminate material from the laminate receiving face and to transfer the laminate material to the surface of the moving article to laminate the previously applied label.

5. The method of claim 4, wherein a common gas passage means communicates with the receiving faces of the label applying station and the laminate applying station.

6. The method of claim 4, wherein independent gas passage means communicate with the receiving faces of the label applying station and the laminate applying station.

7. The method of claim 4, wherein the label is releasably retained at the label applying station and the laminate material is releasably retained at the laminate applying station by drawing a vacuum upon a vacuum box, the vacuum box having a lower grid surface with grid openings which also comprise the receiving faces of the label applying station and the laminate applying station.

8. The method of claim 7, wherein the label is applied to the article surface, and the laminate material is transferred to the previously applied label by intermittently supplying a blast of gas through a plurality of flexible tubes which terminate at the vacuum grid openings to blow the label and then the laminate material onto the article surface.

* * * * *